(12) United States Patent
Kimura (10) Patent No.: US 11,233,938 B2
(45) Date of Patent: Jan. 25, 2022

(54) POWER MANAGEMENT APPARATUS AND POWER MANAGEMENT SYSTEM

(71) Applicant: DENSO CORPORATION, Kariya (JP)

(72) Inventor: Masao Kimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/822,375

(22) Filed: Mar. 18, 2020

(65) Prior Publication Data

US 2020/0304712 A1 Sep. 24, 2020

(30) Foreign Application Priority Data

Mar. 20, 2019 (JP) .............................. JP2019-053118

(51) Int. Cl.
*H04N 5/232* (2006.01)
*B60R 16/03* (2006.01)
*B60R 11/04* (2006.01)

(52) U.S. Cl.
CPC ......... *H04N 5/23241* (2013.01); *B60R 16/03* (2013.01); *B60R 11/04* (2013.01); *B60R 2300/404* (2013.01)

(58) Field of Classification Search
CPC ................ H04N 5/23241; B60R 16/03; B60R 2300/404
See application file for complete search history.

(56) References Cited

U.S. PATENT DOCUMENTS

| | | | | |
|---|---|---|---|---|
| 7,890,227 | B2 * | 2/2011 | Sayama | H02J 9/061 701/31.7 |
| 9,008,898 | B2 * | 4/2015 | Umesaka | G07C 5/085 701/33.2 |
| 9,377,497 | B2 * | 6/2016 | Sievers | G01R 31/005 |
| 9,566,920 | B2 * | 2/2017 | Melzl | G06F 11/0751 |
| 9,701,318 | B2 * | 7/2017 | Amoh | G06F 1/28 |
| 9,748,064 | B2 * | 8/2017 | Sawano | H01H 47/002 |
| 9,778,970 | B2 * | 10/2017 | Kume | G06F 11/079 |
| 10,873,472 | B2 * | 12/2020 | Lagrange | H04L 12/12 |
| 2006/0092278 | A1 * | 5/2006 | Kondo | B60R 25/102 348/152 |
| 2006/0200276 | A1 * | 9/2006 | Sayama | H02J 9/061 701/1 |

(Continued)

FOREIGN PATENT DOCUMENTS

JP 4288968 B2 7/2009
JP 2014135608 A * 7/2014
KR 102058560 B1 * 12/2019

*Primary Examiner* — John Villecco
(74) *Attorney, Agent, or Firm* — Maschoff Brennan (57) ABSTRACT

In a power management apparatus communicable with a controller of an electrical load via a communication interface, the power management apparatus includes a control power generator configured to generate control power and supply the control power to the controller, and a reset terminal connected to the controller. The power management apparatus includes a reset control circuit configured to transmit a reset control signal from the reset terminal to the controller for controlling resetting of the controller, and a storage unit accessible by the controller via the communication interface. The power management apparatus includes a check unit configured to check for a state of the reset terminal, and store a checked result of the state of the reset terminal in the storage unit.

11 Claims, 4 Drawing Sheets

(56) References Cited

U.S. PATENT DOCUMENTS

| | | | | |
|---|---|---|---|---|
| 2009/0234531 A1* | 9/2009 | Sayama | ............... | H02J 9/061 |
| | | | | 701/31.7 |
| 2011/0043180 A1* | 2/2011 | Babasaki | ............... | B60R 16/03 |
| | | | | 323/283 |
| 2012/0271507 A1* | 10/2012 | Umesaka | ............ | G07C 5/0816 |
| | | | | 701/33.2 |
| 2013/0015797 A1* | 1/2013 | Itou | ............... | H02P 6/12 |
| | | | | 318/400.21 |
| 2014/0375327 A1* | 12/2014 | Sievers | ............ | G01R 19/0084 |
| | | | | 324/503 |

\* cited by examiner

POWER MANAGEMENT APPARATUS AND POWER MANAGEMENT SYSTEM

CROSS-REFERENCE TO RELATED APPLICATION

This application is based on and claims the benefit of priority from earlier Japanese Patent Application No. 2019-053118 filed on Mar. 20, 2019, the entire disclosure of which is incorporated herein by reference.

TECHNICAL FIELD

The present disclosure relates to technologies for power management apparatuses.

BACKGROUND

There are various power control apparatuses for controlling output power supplied from a power supply circuit.

SUMMARY

A power management apparatus for a vehicular camera module includes a reset control circuit configured to transmit a reset control signal from a reset terminal to a controller for controlling resetting of the controller, and a storage unit accessible by the controller via a communication interface. The power management apparatus includes a check unit configured to check for a state of the reset terminal, and store a checked result of the state of the reset terminal in the storage unit.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT VIEWPOINT

One of power supply control apparatuses, which is disclosed in Japanese Patent Publication No. 4288968, includes a power supply circuit, a communication host device, and a sensor circuit.

The power supply circuit, which has a function of supplying controlled output power to one or more electrical loads, is communicably connected to the power supply circuit via a serial communication line. The sensor circuit detects the occurrence of a malfunction in, for example, the power supply circuit. The communication host device continuously sends a communication signal to the power supply circuit upon the sensor circuit detecting no malfunctions in the power supply circuit.

In contrast, the communication host device changes the communication signal such that the communication signal has a predetermined constant level within a predetermined period upon the sensor circuit having detected a malfunction in the power supply circuit. This therefore enables the power supply circuit to determine the occurrence of a malfunction therein, and to turn off the supply of the output power to the one or more electrical loads.

Let us consider that such a power control apparatus is applied to a vehicular camera module, which is comprised of a camera and a controller for controlling the camera. At that time, we have considered that the power supply circuit of the power control apparatus applied to the camera module is deigned to monitor the controller of the camera module, and to have a function of resetting the controller upon detecting a malfunction therein.

Users for such a power control apparatus applied to a vehicular camera module are likely to require the power control apparatus to have a function of checking whether the reset function works normally at the time of the vehicular camera module being activated. This user's requirement aims to satisfy high-level security needs for vehicles.

A specific example of such a checking function is configured to

1. Generate a deliberate malfunction in the power supply circuit to thereby cause the power supply circuit to reset the controller 2. Check whether the controller has been restarted This specific example may however need restarting of the controller, resulting in delay of activation of the camera module. Shortening a time required for activation of the camera module may be therefore desired.

In view of the circumstances set forth above, an aspect of the present disclosure seeks to provide power control apparatuses, each of which is capable of having a smaller time required for a camera module to be activated.

According to a first exemplary aspect of the present disclosure, there is provided a power management apparatus for a vehicular camera module. The power management apparatus is communicable with a controller for a vehicular camera via a communication interface. The power management apparatus includes a control power generator configured to generate control power and supply the control power to the controller, and a reset terminal connected to the controller. The power management apparatus includes a reset control circuit configured to transmit a reset control signal from the reset terminal to the controller for controlling resetting of the controller, and a storage unit accessible by the controller via the communication interface. The power management apparatus includes a check unit configured to check for a state of the reset terminal, and store a checked result of the state of the reset terminal in the storage unit.

According to a second exemplary aspect of the present disclosure, there is provided a power management system. The power management system includes a controller for a vehicular camera of a vehicular camera module, a communication interface, and a power management apparatus communicable with the controller for the vehicular camera via the communication interface.

The power management apparatus includes a control power generator configured to generate control power and supply the control power to the controller, a reset terminal connected to the controller, and a reset control circuit configured to transmit a reset control signal from the reset terminal to the controller for controlling resetting of the controller.

The power management apparatus includes a storage unit accessible by the controller via the communication interface, and a check unit configured to check for a state of the reset terminal, and store a checked result of the state of the reset terminal in the storage unit.

The controller is configured to access the storage unit via the communication interface to thereby detect the checked result of the state of the reset terminal, and determine whether the checked result of the state of the reset terminal represents that there is a fault in the reset terminal. The controller is configured to shutdown itself upon the checked result of the state of the reset terminal representing that there is a fault in the reset terminal, and perform a predetermined normal operation upon the checked result of the state of the reset terminal representing that there are no faults in the reset terminal.

According to a third exemplary aspect of the present disclosure, there is provided a power management system. The power management system includes a power management apparatus according to the first exemplary aspect, and a controller for controlling a vehicular camera. The controller is configured to 1. Access the storage unit of the power management apparatus via the communication interface of the power management apparatus to thereby detect the checked result of the state of the reset terminal of the power management apparatus;

2. Determine whether the checked result of the state of the reset terminal represents that there is a fault in the reset terminal 3. Shutdown itself upon the checked result of the state of the reset terminal representing that there is a fault in the reset terminal 4. Perform a predetermined normal operation upon the checked result of the state of the reset terminal representing that there are no faults in the reset terminal The subject matter of each of the power management apparatus according to the first exemplary aspect and the power management system according to the second exemplary aspect and the power management system according to the third exemplary aspect is configured to store the checked result of the state of the reset terminal in the storage unit. This enables the controller to detect the checked result of the state of the reset terminal from the storage unit, and determine whether there is a fault in the reset terminal.

This therefore eliminates the need of generating a deliberate malfunction in the power management apparatus and therefore eliminates the need of resetting the controller during activation of the vehicular camera module. This therefore reduces a time required for the controller to be activated.

Embodiment

From this viewpoint, the following describes an exemplary embodiment of the present disclosure with reference to the accompanying drawings.

The following describes a vehicular camera module 10 according to the exemplary embodiment with reference to FIGS. 1 to 4.

Figure 1:
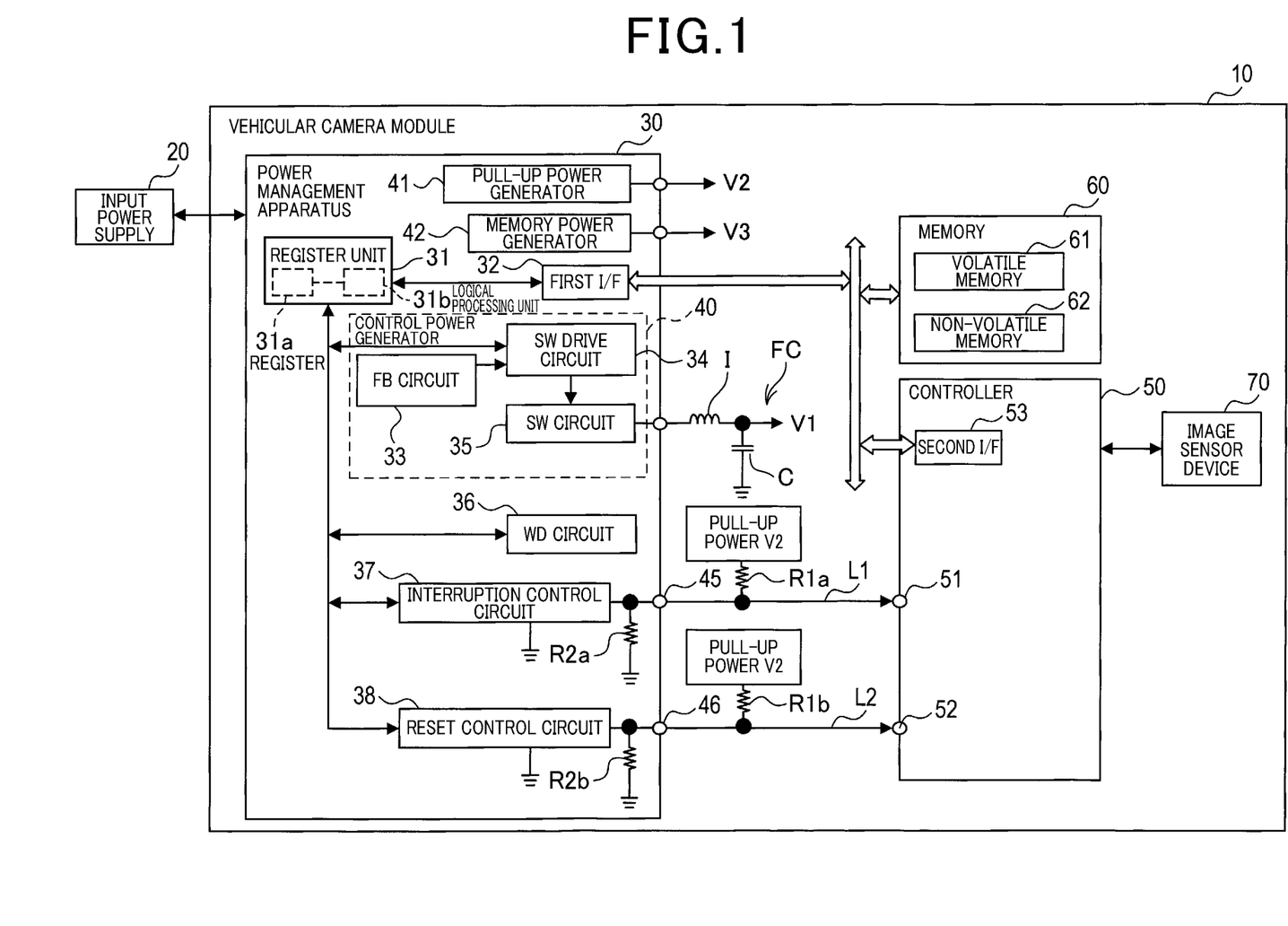
FIG. 1 is a circuit diagram schematically illustrating a vehicular camera module according to an exemplary embodiment of the present disclosure.

Referring to FIG. 1, the vehicular camera module 10 installed in a vehicle includes a power management apparatus 30, a controller 50, a memory 60, and an image sensor device 70. The vehicular camera module 10 also includes a filter circuit FC comprised of an inductor I and a capacitor C, first and second pull-up resistors R1$a$ and R1$b$, and first and second signal lines L1 and L2. The first and second pull-up resistors R1$a$ and R1$b$ respectively have predetermined resistances r1$a$ and r1$b$.

The power management apparatus 30, the controller 50, and the memory 60 0 are communicably connected to one another via buses B.

The power management apparatus 30 of the vehicular camera module 10 serves as, for example, a power control apparatus according to the exemplary embodiment.

The power management apparatus 30 is comprised of, for example, a power integrated circuit (IC), and is configured to 1. Receive input power supplied from an input power supply 20, such as a power supply inputted from a vehicular battery 2. Generate, based on the received input power, appropriate levels, i.e. appropriate voltages, of output power, which are suitable for respective components in the vehicular camera module 10, such as the controller 50, memory device 60, and image sensor 70

3. Supply the appropriate levels of the output power to the respective components in the vehicular camera module 10

The controller 50 is designed as, for example, a computer circuit comprised of a CPU, and is configured to control the image sensor device 70.

The memory device 60 includes, for example, a volatile memory 61 and a non-volatile memory 62. The volatile memory 61 serves as a working memory in which the controller 50 performs various tasks, and the non-volatile memory 62 stores various programs, i.e. program codes, that enable the controller 50 to perform various functions and/or various tasks for controlling the image sensor device 70.

The image sensor device 70 is comprised of, for example, a lens system and an image sensor, such as a known charge-coupled device (CCD) image sensor or a complementary metal-oxide-semiconductor (CMOS) image sensor. The image sensor device 70 is mounted on a predetermined portion of the vehicle.

Under control of the controller 50, the image sensor of the image sensor device 70 generates an image of a directional view of the vehicle, such as a front view, based on light incident from the corresponding direction of the directional view, such as the front of the vehicle.

Next, the following describes in detail the power management apparatus 30.

The power management apparatus 30 includes a control power generator 40, a pull-up power generator 41, a memory power generator 42, a register unit 31, and a first communication interface (I/F) unit 32. The power management apparatus 30 also includes a watchdog (WD) circuit 36, an interruption control circuit 37, a reset control circuit 38, first and second pull-down resistors R2$a$ and R2$b$, a first interruption terminal 45, and a first reset terminal 46. The first and second pull-down resistors R2$a$ and R2$b$ respectively have predetermined resistances r2$a$ and r2$b$. The resistance r2$a$ of the first pull-down resistor R2$a$ is set to be higher than the resistance r1$a$ of the first pull-up resistor R1$a$, and the resistance r2$b$ of the second pull-down resistor R2$b$ is set to be higher than the resistance r1$b$ of the second pull-up resistor R1$b$.

The controller 50 includes a second communication interface (I/F) 53, a second interruption terminal 51, and a second reset terminal 52.

The interruption control circuit 37 is connected to the first interruption terminal 45 via a signal line to which a common signal ground is connected via the second pull-down resistor R2$a$.

The reset control circuit 38 is connected to the first reset terminal 46 via a signal line to which the common signal ground is connected via the second pull-down resistor R2b. The common signal ground has a predetermined reference voltage level Vlow of, for example, zero volts; the reference voltage level Vlow will also be referred to as a low voltage level Vlow hereinafter.

Because the first signal line L1 is connected to the common signal ground via the second pull-down resistor R2a, the voltage level at the first signal line L1 is pulled down at the reference voltage level Vlow. Similarly, because the second signal line L2 is connected to the common signal ground via the second pull-down resistor R2b, the voltage level at the second signal line L2 is pulled down at the reference voltage level Vlow.

The first interruption terminal 45 is connected to the second interruption terminal 51 via the first signal line L1, and the first reset terminal 46 is connected to the second reset terminal 52 via the second signal line L2. The first reset terminal 46 serves as, for example, a reset terminal according to the exemplary embodiment.

The control power generator 40 includes, for example, a feedback (FB) circuit 33, a switching (SW) drive circuit 34, a switching (SW) circuit 35. The control power generator 40 is configured to generate, based on the input power, i.e. an input voltage, supplied from the input power supply device 20, control power V1 having a voltage; the voltage of the control power V1 will also be referred to as an output voltage V1.

The input voltage supplied from the input power supply device 20 is inputted to the switching circuit 35. The switching circuit 35 is comprised of at least one switch that is connected to the switching drive circuit 34. This enables the switching drive circuit 34 to turn on or off the at least one switch of the switching circuit 35, so that an output voltage is outputted from the switching circuit 35 based on the input voltage.

Specifically, the feedback circuit 33 cyclically performs a feedback task configured to 1. Receive the output voltage of the switching circuit 35 fed back from the switching circuit 35
2. Generate an on/off control signal that enables on-off switching operations of the at least one switch based on the on/off control signal to adjust a value of the output voltage V1 of the switching circuit 35 to be in agreement with a predetermined target voltage corresponding to an operation voltage of the controller 50
3. Send the on/off control signal to the switching drive circuit 34, so that the switching drive circuit 34 performs on-off switching operations of the at least one switch to thereby adjust the value of the output voltage V1 of the switching circuit 35 to be in agreement with the predetermined target voltage.

The control power V1 outputted from the switching circuit 35 is supplied to the controller 50 through the filter circuit FC while high-frequency noise contained in the control power V1 is eliminated by the filter circuit FC.

The pull-up power generator 41, which has substantially the same configuration as the configuration of the control power generator 40, is configured to generate, based on the input power supplied from the input power supply device 20, pull-up power V2 having a voltage; the voltage of the pull-up power V2 will also be referred to as a pull-up voltage V2. The pull-up voltage V2 serves as a high voltage level V2. The pull-up power generator 41 has an output terminal connected to each of the first and second signal lines L1 and L2 via a corresponding one of the first and second pull-up resistors R1a and R1b.

That is, the pull-up power generator 41 is configured to pull up the reference voltage level Vlow at each of the first interruption terminal 45 and the first reset terminal 51 to the pull-up voltage V2 higher than the low voltage level Vlow, and to pull up the reference voltage level Vlow at each of the second interruption terminal 46 and the second reset terminal 52 to the pull-up voltage V2 higher than the reference voltage level Vlow.

The pull-up power generator 41 serves as, for example, a reset power generator.

Note that the pull-up power V2 serves as, for example, reset power, and the pull-up power supply circuit 41 serves as, for example, a reset power supply circuit.

The memory power generator 42, which has substantially the same configuration as the configuration of the control power generator 40, is configured to generate, based on the input power supplied from the input power supply device 20, memory power V3 having a voltage; the voltage of the memory power V3 corresponds to an operation voltage of the memory device 60.

The first communication interface unit 32 serves as an interface that enables all the components of the power management apparatus 30 to communicate with the memory device 60 and the second communication interface unit 53 of the controller 50 via the buses B. In particular, the first communication interface 32 enables the register unit 31 to communicate with the memory device 60 and the second communication interface unit 53 of the controller 50 via the buses B.

Note that the first communication interface unit 32 serves as, for example, a communication interface.

The register unit 31 is comprised of, for example, a register 31a and a logical processing circuit 31b communicably connected to the register 31a; various items of information are storable in the register 31a; the register unit 31 is communicably connected to the circuits 36, 37, 38, 40, 41, and 42. The register 31a serves as, for example, a storage unit.

The watchdog circuit 36 is connected to at least the reset control circuit 38, and is configured to periodically write a predetermined watchdog key comprised of, for example, a data code into the register 31a while updating it.

The controller 50 is configured to periodically access the register 31a via the first and second interfaces 32 and 53 to thereby periodically read the watchdog key stored in the register 31a. Then, the controller 50 is configured to perform a predetermined calculation based on the watchdog key, and transmit, to the watchdog circuit 36, a result of the predetermined calculation via the first and second interfaces 32 and 53.

The watchdog circuit 36 has a correct solution on the predetermined calculation based on the watchdog key, and receives the result of the predetermined calculation transmitted from the controller 50. Then, the watchdog circuit 36 determines whether the result of the predetermined calculation transmitted from the controller 50 is in agreement with the correct solution to thereby monitor whether the controller 50 is operating normally.

That is, upon determining that the result of the predetermined calculation transmitted from the controller 50 is in agreement with the correct solution, the watchdog circuit 36 determines that the controller 50 is operating normally. Otherwise, upon determining that the result of the predetermined calculation transmitted from the controller 50 is in disagreement with the correct solution, the watchdog circuit 36 determines that the controller 50 is operating abnormally. Then, the watchdog circuit 36 causes the reset control circuit 38 to reset the controller 50. How the reset control circuit 38 resets the controller 50 will be described later. Note that transmission of the result of the predetermined calculation based on the watchdog key from the controller 50 to the power management apparatus 30 will be referred to as a watchdog communication.

The interruption control circuit 37 is connected between the first interruption terminal 45 and the common signal ground, and is configured to be switched on or off under control of the register unit 31. That is, when the interruption control circuit 37 is switched on, the voltage level at the first interruption terminal 45 is set to the reference voltage level Vlow. Otherwise, when the interruption control circuit 37 is switched off, the voltage level at the first interruption terminal 45 depends on whether the pull-up power V2 is applied to the first signal line L1. For example, the interruption control circuit 37 is comprised of an open drain switch or an open collector switch or another semiconductor switch.

The reset control circuit 38 is connected between the first reset terminal 46 and the common signal ground, and is configured to be switched on or off under control of the register unit 31. That is, when the reset control circuit 38 is switched on, the voltage level at the first reset terminal 46 is set to the reference voltage level Vlow. Otherwise, when the reset control circuit 38 is switched off, the voltage level at the first reset terminal 46 depends on whether the pull-up power V2 is applied to the second signal line L2. For example, the reset control circuit 38 is comprised of an open drain switch or an open collector switch or another semiconductor switch.

The second pull-down resistor R2$a$ is connected between the common signal ground and the first interruption terminal 45 to be parallel to the interruption control circuit 37. Similarly, the second pull-down resistor R2$b$ is connected between the common signal ground and the first reset terminal 46 to be parallel to the reset control circuit 38.

When the reset control circuit 38 is switched on, i.e. closed, the voltage level at the first reset terminal 46 is set to the reference voltage level Vlow. This causes a low-level signal with the reference voltage level Vlow to be transmitted from the first reset terminal 46 to the second reset terminal 52.

When receiving the low-level signal through the second reset terminal 52, the controller 50 determines whether the level of the received signal is lower than a low-voltage threshold or higher than a high-voltage threshold. The low-voltage threshold is previously set to be higher than the reference voltage level Vlow, and the high-voltage threshold that is previously set to be higher than the low-voltage threshold and lower than the high voltage level V2.

Because the reference voltage level Vlow of the low-level voltage signal is lower than the low-voltage threshold, the controller 50 determines that the received signal is the low-level signal, and performs a restart operation, i.e. reboot operation, so that the controller 50 is reset, and thereafter restarted.

When pull-up power V2 is applied to the second signal line L2 while the reset control circuit 38 is off, i.e. opened, the voltage level at the first reset terminal 46 is set to the pull-up voltage V2, i.e. the high voltage level V2. This causes a high-level voltage signal with the high voltage level V2 to be transmitted from the first reset terminal 46 to the second reset terminal 52. The low-level and high-level signals to be outputted from the first reset terminal 46 will also be referred to as reset control signals.

When receiving the high-level signal through the second reset terminal 52, the controller 50 determines whether the level of the received signal is lower than the low-voltage threshold or higher than the high-voltage threshold. Because the high voltage level V2 of the high-level voltage signal is higher than the high-voltage threshold, the controller 50 determines that the received signal is the high-level signal, so that the controller 50 is boosted, i.e. activated.

While the reset control circuit 38 is in the off state, the voltage level at the first reset terminal 46 can be expressed by the following equation (1)

$$VL(46)=V2 \times r2b/(r1b+r2b) \qquad (1)$$

where

1. Vl(46) represents the voltage level at the first reset terminal 46,
2. r1$b$ represents the resistance of the second pull-up resistor R1$b$
3. r2$b$ represents the resistance of the second pull-down resistor R2$b$ Because the resistance r2$b$ of the second pull-down resistor R2$b$ is set to be higher than the resistance r1$b$ of the second pull-up resistor R1$b$, the higher the resistance r2$b$ relative to the resistance r1$b$, the higher the difference between the high voltage level V2 and the low voltage level Vlow. This enables the difference between the low-voltage threshold and the high-voltage threshold to be larger, making it possible to prevent erroneous identification of each of the low-level signal and the high-voltage signal.

When the reset control circuit 38 is in an on state and the first reset terminal 46 has been short-circuited, the voltage level at the first reset terminal 46 is set to the high voltage level V2. Note that the first reset terminal 46 having been short-circuited represents that the pull-up power V2 has been directly applied to the first reset terminal 46. The first reset terminal 46 having been short-circuited will be referred to as a short-circuit fault in the first reset terminal.

When the reset control circuit 38 is in the off state and the first reset terminal 46 has opened, the second pull-down resistor R2$b$ enables the voltage level at the first reset terminal 46 to be pulled down to the low voltage level Vlow. The first reset terminal 46 having opened represents that no connection is established between the first reset terminal 46 and the pull-up power generator 41, so that no pull-up power V2 has been applied to the first reset terminal 46. The first reset terminal 46 having opened will be referred to as an open fault in the first reset terminal.

Similarly, when the interruption control circuit 37 is switched on, the voltage level at the first interruption terminal 45 is set to the reference voltage level Vlow. This causes the low-level voltage signal with the reference voltage level Vlow to be transmitted from the first interruption terminal 45 to the second interruption terminal 51.

The operations of the controller 50 when the low-level voltage signal is transmitted from the first interruption terminal 45 to the controller 50 are substantially the same as the operations of the controller 50 when the low-level voltage signal is transmitted from the first reset terminal 45 to the controller 50.

When pull-up power V2 is applied to the first signal line L1 while the reset control circuit 38 is off, the voltage level at the first interruption terminal 45 is set to the pull-up voltage V2, i.e. the high voltage level V2. This causes the high-level voltage signal with the high voltage level V2 to be transmitted from the first interruption terminal 45 to the second interruption terminal 51.

The operations of the controller 50 when the high-level voltage signal is transmitted from the first interruption terminal 45 to the controller 50 are substantially the same as the operations of the controller 50 when the high-level voltage signal is transmitted from the first reset terminal 45 to the controller 50.

The logical processing unit 31b of the register unit 31 is configured to store, in the register 31a, the settings of various power supplies including the setting of the control power V1, the setting of the pull-up power V2, and the setting of the memory power V3.

The register 31a includes a watchdog counter.

The logical processing unit 31b is also configured to store, in the watchdog counter of the register 31a, the number of stops of the watchdog communication from the controller 50, and store, in the register 31a, the state of the first reset terminal 46. Note that the settings of the various power supplies include, for example, the level of each of the power supplies, and a predetermined order of determining the levels of the power supplies.

That is, the logical processing unit 31b is configured to control the control power generator 40, the pull-up power generator 41, and the memory power generator 42 to thereby determine the control power V1, the pull-up power V2, and the memory power V3 as the respective outputs of the power generators 40, 41, and 42 in the predetermined order.

In particular, the predetermined order is determined such that determination of the memory power V3 is earlier than determination of the pull-up power V2 according to the exemplary embodiment.

The logical processing unit 31b is configured to control the control power generator 40, pull-up power generator 41, memory power generator 42.

In addition, the logical processing unit 31b is configured to check for the state of the first reset terminal 46 at boot-up, i.e. activation, of the vehicular camera module 10, i.e. the controller 50, and store the checked result in the register 31a. The logical processing unit 31b is also configured to continuously or periodically monitor the state of the first reset terminal 46 after activation of the controller 50, and store the monitored result in the register 31a.

The logical processing unit 31b is configured to perform interruption control for each of the various power supplies including the control power V1, the pull-up power V2, and the memory power V3.

That is, the logical processing unit 31b is configured to control the interruption control circuit 37 to thereby output the low-level signal to the controller 50 from the first interruption terminal 45 upon determining that there is a failure in at least one of the power supplies.

Similarly, the logical processing unit 31b is configured to perform reset control for each of the various power supplies including the control power V1, the pull-up power V2, and the memory power V3.

That is, the logical processing unit 31b is configured to control the reset control circuit 38 to thereby output the low-level signal to the controller 50 from the first reset terminal 46 upon determining that there is a failure in at least one of the power supplies.

The register unit 31 of the exemplary embodiment serves as, for example, a storage unit, a determination unit, and a monitor unit.

Fault Detection Routine During Activation of the Vehicular Camera Module 10

Figure 2:
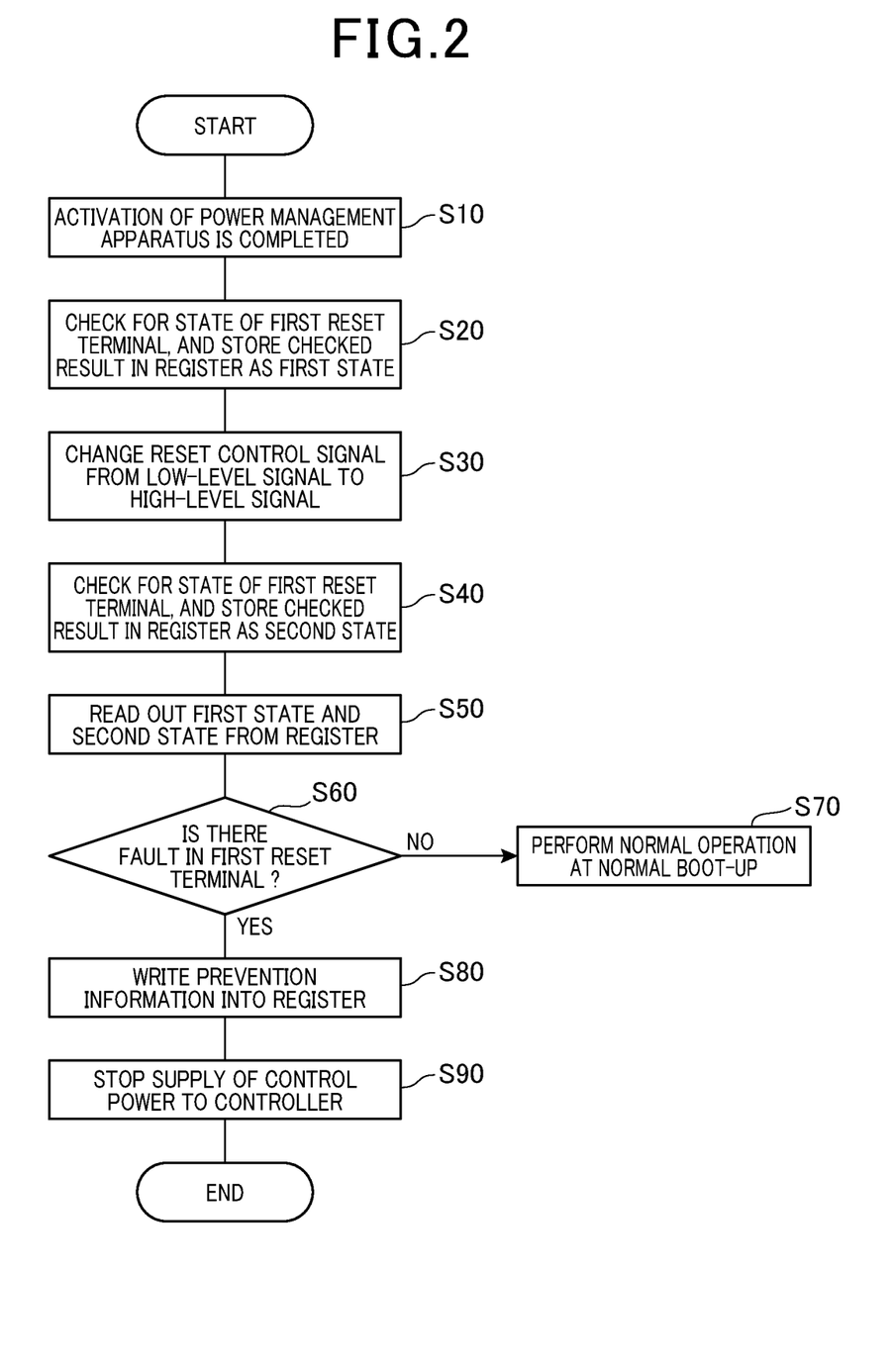
FIG. 2 is a flowchart schematically illustrating a fault detection routine during activation of the vehicular camera module according to the exemplary embodiment.

Next, the following describes how the power management apparatus 30 and controller 50 cooperatively perform a fault detection routine during activation, i.e. boot-up, of the vehicular camera module 10 with reference to the flowchart of FIG. 2. Note that the controller 50 performs several steps in the fault detection routine in accordance with at least one of the various programs stored in the non-volatile memory 62.

When the vehicular battery is powered on, the input power supply 20 supplies the input power to the power management apparatus 30, so that activation of the power management apparatus 30 is completed, and the logical processing unit 31b of the register unit 31 determines the levels of the power supplies in the previously determined order in step S10. When activation of the power management apparatus 30 is completed, each of the interruption control circuit 37 and the reset control circuit 38 is in the on state, so that the controller 50 is in a shutdown condition.

Next, the logical processing unit 31b serves as, for example, a check unit, i.e. a monitor unit, that checks for, i.e. monitor, the state of the first reset terminal 46, and stores the checked result of the state of the first reset terminal 46 in the register 31a as a first state in step S20. In particular, the logical processing unit 31b stores, as the first state, the checked result of the state of the first reset terminal 46 in the register 31 while the reset control circuit 38 is in the on state so that the reset control signal is the low-level signal before activation of the controller 50. In other words, because the reset control circuit 38 is in the on state, the logical processing unit 31b determines whether the first reset terminal 46 has been short-circuited.

Next, the logical processing unit 31b turns off the reset control circuit 38 to thereby change the reset control signal from the low-level signal to the high-level signal in step S30. This causes the controller 50 to be activated. Note that, if the first reset terminal 46 has been short-circuited, determination of the pull-up power V2 by the logical processing unit 31b in step S1 changes the reset control signal from the low-level signal to the high-level signal, so that the controller 50 is activated without turn-off of the reset control circuit 38.

Subsequently, the logical processing unit 31b serves as, for example, the check unit that periodically checks for the state of the first reset terminal 46 after activation of the controller 50, and periodically updates the checked result of the state of the first reset terminal 46 in the register 31a as a second state in step S40.

In particular, the logical processing unit 31b stores, as the second state, the checked result of the state of the first reset terminal 46 in the register 31 while the reset control circuit 38 is in the off state so that the reset control signal is the high-level signal after activation of the controller 50. In other words, because the reset control circuit 38 is in the off state, the logical processing unit 31b determines whether the first reset terminal 46 has opened.

Following the operation in step S40, the controller 50 reads a corresponding program from the non-volatile memory 62 of the memory device 60, and performs a readout task from the register unit 31 in accordance with the readout program in step S50. Specifically, the controller 50 accesses the register unit 31 via the second and first communication interfaces 53 and 32 to thereby read the first and second states of the first reset terminal 46 in step S50.

At the time of the operation in step S50, if the memory power V3 as the output of the memory power generator 42 were not determined, the controller 50 would not read, from the non-volatile memory 62, the program corresponding to the operation in step S50, resulting in the controller 50 failing to read the first and second states of the first reset terminal 46. This therefore, if the first reset terminal 46 has been short-circuited, would make it difficult for the controller 50 to read the first state of the first reset terminal 46 during activation of the controller 50, resulting in the controller 50 failing to perform an operation to address the short-circuited state of the first reset terminal 46.

For addressing such an issue, as described above, the register unit 31 performs determination of the memory power V3 earlier than determination of the pull-up power V2. This enables the controller 50 to reliably read the first and second states of the first reset terminal 46 during activation thereof.

Next, the controller 50 determines whether there is a fault in the first reset terminal 46 based on the first and second states of the first reset terminal 46 in step S60. Upon determining that there are no faults in the first reset terminal 46 (NO in step S60), the controller 50 performs normal operations at the normal boot-up, i.e. starts the normal operations in step S70.

Otherwise, upon determining that there is a fault, i.e. a short-circuit fault or an open fault in the first reset terminal (YES in step S60), the controller 50 accesses the register unit 31 via the second and first communication interfaces 53 and 32 to thereby write, into the register 31a, prevention information indicative of prevention of power supply from the control power generator 40 to the controller 50 in the register 31a in step S80.

Following the operation in step S80, the logical processing unit 31b of the register 31 serves as, for example, a stop unit that interrupts the switching operations of the switching circuit 35 via the switching drive circuit 34 in response to the writing of the prevention information into the register 31a in step S90. This stops the supply of the control power V1 from the control power generator 40 to the controller 50, causing the controller 50 to be shutdown.

First Fault Detection Routine after Normal Activation of the Controller 50

Next, the following describes how the power management apparatus 30 and controller 50 cooperatively perform a first fault detection routine after the normal activation of the controller 50 with reference to the flowchart of FIG. 2. Note that the power management apparatus 30 and the controller 50 periodically perform the first fault detection routine after the normal activation of the controller 50.

Figure 3:
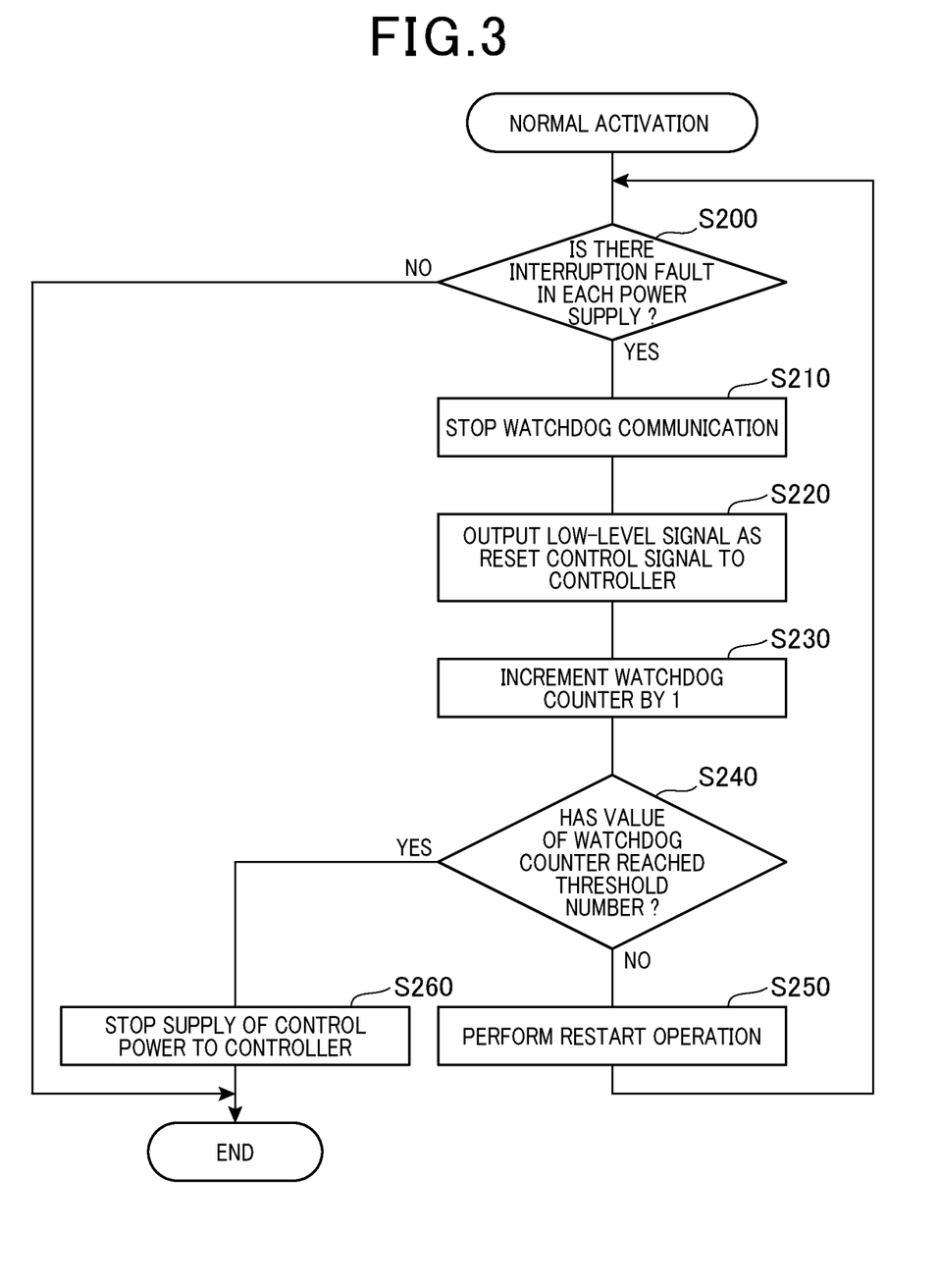
FIG. 3 is a flowchart schematically illustrating a first fault detection routine according to the exemplary embodiment.

When starting the first fault detection routine, the controller 50 determines whether there is an interruption fault in each of the power supplies in step S200. That is, the logical processing unit 31b of the register unit 31 determines whether there is a fault in each of the power supplies including the control power V1, the pull-up power V2, and the memory power V3. For example, upon determining an abnormal drop in the memory power V3, the logical processing unit 31b turns off the interruption control circuit 37 to thereby output the low-level signal as the interruption control signal to the controller 50 from the first interruption terminal 45. That is, when determining that there is a fault in one of the power supplies including the control power V1, the pull-up power V2, and the memory power V3, the logical processing unit 31b transmits the low-level signal to the controller 50 without directly resetting the controller 50.

Upon determining that there are no interruption faults because the high-level signal is inputted to the second interruption terminal 51 (NO in step S200), the controller 50 accesses the register unit 31 via the second and first communication interfaces 53 and 32 to cause the logical processing unit 31b to reset the watchdog counter to an initial value of zero, and terminates the first fault detection routine. Otherwise, upon determining that there is an interruption fault because the high-level signal is inputted to the second interruption terminal 51 (YES in step S200), the controller 50 stops the watchdog communication in step S210.

When determining that no watchdog communication has been transmitted from the controller 50 for a predetermined threshold period, the logical processing unit 31b determines that the controller 50 stops the watchdog communication, and turns off the reset control circuit 38 to thereby output the low-level signal as the reset control signal to the controller 50 from the first reset terminal 46 in step S220.

Next, the logical processing unit 31b serves as, for example, a receiving unit that increments the watchdog counter in the register 31a by 1 to thereby count and store the number of stops of the watchdog communication from the controller 50 in step S230. Note that the receiving unit of the logical processing unit 31b is configured to periodically perform a receiving operation of receiving the watchdog communication based on the watchdog key periodically transmitted from the controller 50.

Subsequently, the logical processing unit 31b determines whether the value of the watchdog counter has reached a predetermined threshold in step S240.

Upon determining that the value of the watchdog counter has not reached the predetermined threshold (NO in step S240), the controller 50 performs the restart operation, i.e. reboot operation, so that the controller 50 is reset, and thereafter restarted in step S250. After the restarting, the controller 50 starts to perform the first fault detection routine from step S200.

That is, the controller 50 repeatedly performs the first fault detection routine until the operation in step S200 is NO or the value of the watchdog counter has reached the predetermined threshold.

Otherwise, upon determining that the value of the watchdog counter has reached the predetermined threshold (YES in step S240), the logical processing unit 31b serves as, for example, the stop unit that interrupts the switching operations of the switching circuit 35 via the switching drive circuit 34 in step S260. This stops the supply of the control voltage V1 from the control power generator 40 to the controller 50, causing the controller 50 to be shutdown. Thereafter, the logical processing unit 31b terminates the first first fault detection routine.

Second Fault Detection Routine after Normal Activation of the Controller 50

Next, the following describes how the power management apparatus 30 and controller 50 cooperatively perform a second fault detection routine after the normal activation of the controller 50 with reference to the flowchart of FIG. 2. Note that the power management apparatus 30 and the controller 50 periodically perform the second first fault detection routine after the normal activation of the controller 50 in parallel with the first fault detection routine.

Figure 4:
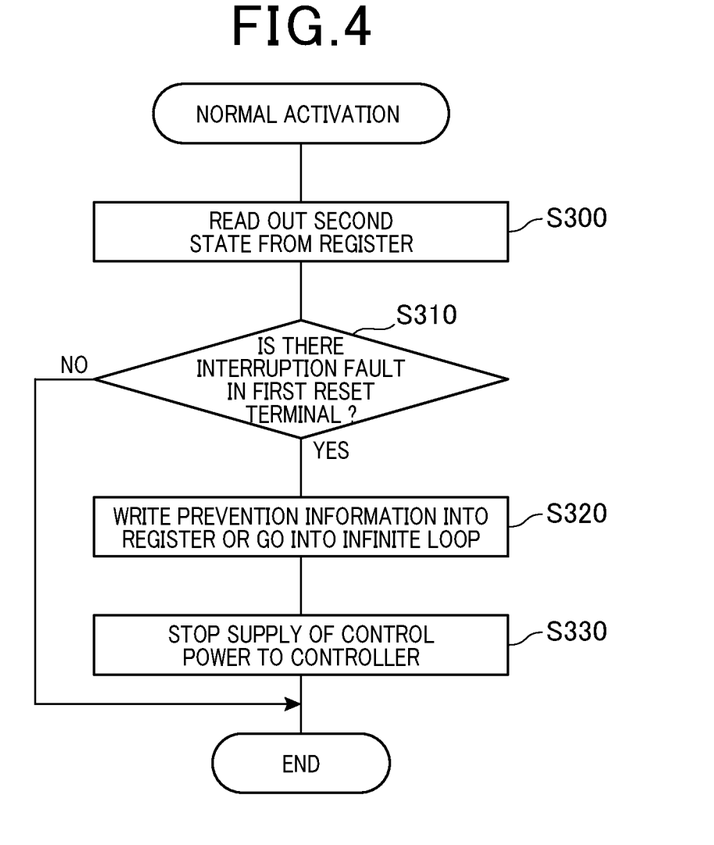
FIG. 4 is a flowchart schematically illustrating a second fault detection routine according to the exemplary embodiment.

When starting the second fault detection routine, the controller 50 accesses the register unit 31 via the second and first communication interfaces 53 and 32 to thereby read the second state of the first reset terminal 46 in step S300. As described above, the logical processing unit 31b periodically checks for the state of the first reset terminal 46 after activation of the controller 50, and periodically updates the checked result of the state of the first reset terminal 46 in the register 31a as the second state (see step S40).

Next, the controller 50 determines whether there is a fault in the first reset terminal 46 based on the second state of the first reset terminal 46 in step S310. Upon determining that there are no faults in the first reset terminal 46 (NO in step S310), the controller 50 terminates the second fault detection routine.

Otherwise, when it is determined that there is a fault in the first reset terminal 46, i.e. there is the open fault in the first reset terminal 46 (YES in step S310), the second fault detection routine proceeds to step S320.

In step S320, the controller 50 accesses the register unit 31 via the second and first communication interfaces 53 and 32 to thereby write, into the register 31*a*, prevention information indicative of prevention of power supply from the control power generator 40 to the controller 50 in the register 31*a*. Otherwise, in step S320, the controller 50 goes into an infinite loop, and repeats a substantially meaningless loop.

In response to the writing of the prevention information into the register 31*a* in step S320, the logical processing unit 31*b* of the register 31 serves as, for example, the stop unit that interrupts the switching operations of the switching circuit 35 via the switching drive circuit 34 in response to the writing of the prevention information into the register 31*a* in step S330. This stops the supply of the control voltage V1 from the control power generator 40 to the controller 50, causing the controller 50 to be shutdown.

As described above, the vehicular camera module 10 according to the exemplary embodiment achieves the following technical effects.

The logical processing unit 31*b* of the register unit 31 is configured to checks for the state of the first reset terminal 46, and store the checked result of the state of the first reset terminal 46 in the register 31*a* during activation of the vehicular camera module 10. The controller 50 is configured to communicate with the register unit 31 to thereby detect the checked result of the state of the first reset terminal 46.

Upon determining the checked result of the state of the first reset terminal 46 represents a fault in the first reset terminal 46, the controller 50 causes the logical processing unit 31*b* to stop power supply from the control power generator 40 to the controller 50, causing the controller 50 to be shutdown. Otherwise, upon determining the checked result of the state of the first reset terminal 46 does not represent a fault in the first reset terminal 46, the controller 50 performs the normal operations at the normal boot-up.

That is, the configuration of the register unit 31 installed in the power management apparatus 30 eliminates the need of generating a deliberate malfunction in the power management apparatus 30, and therefore eliminates the need of resetting the controller during activation of the vehicular camera module 10. This therefore reduces a time required for the vehicular camera module 10 to be activated.

Upon determining that the first reset terminal 45 has the high voltage level V2 while the first reset terminal 45 is connected to the common signal ground before activation of the controller 50, the logical processing unit 31*b* of the register unit 31 easily determines that there is a short-circuit fault in the first reset terminal 46.

Upon determining that the first reset terminal 45 has the low voltage level Vlow while the first reset terminal 45 is disconnected to the common signal ground after activation of the controller 50, the logical processing unit 31*b* of the register unit 31 easily determines that there is an open fault in the first reset terminal 46.

The logical processing unit 31*b* of the register unit 31 is configured to store the number of stops of the watchdog communication from the controller 50 in the register 31*a*, and stop power supply from the control power generator 40 to the controller 50 upon determining that the stored number has reached the threshold. This configuration reduces the number of restating operations of the controller 50 while an interruption fault has continued in the power management apparatus 30.

The logical processing unit 31*b* periodically checks for the state of the first reset terminal 46 after activation of the controller 50, and periodically updates the checked result of the state of the first reset terminal 46 in the register 31*a* as the second state.

The controller 50 periodically accesses the register unit 31 via the second and first communication interfaces 53 and 32 to thereby periodically read the second state of the first reset terminal 46.

Upon determining that there is a fault in the first reset terminal 46, the controller 50 causes the logical processing unit 31*b* to stop power supply from the control power generator 40 to the controller 50, causing the controller 50 to be shutdown.

This configuration therefore prevents the controller 50 from continuously performing normal operations although there is a fault in the first reset terminal 46.

Upon determining that there is a fault in the first reset terminal 46, the controller 50 can go into an infinite loop, and can repeat a substantially meaningless loop. This configuration therefore prevents the controller 50 from performing the normal operations although there is a fault in the first reset terminal 46.

The second pull-down resistor R2*b* is connected between the common signal ground and the first reset terminal 46 to be parallel to the reset control circuit 38. This arrangement definitely sets voltage level of the first reset terminal 46 to the low voltage level Vlow while the reset control circuit 38 is in the off state and the first reset terminal 46 has opened. This enables the open state of the first reset terminal 46 to be reliably detected.

Setting the resistance r2*b* of the second pull-down resistor R2*b* to be higher than the resistance r1*b* of the second pull-up resistor R1*b* enables the difference between the low-voltage threshold and the high-voltage threshold to be larger, making it possible to prevent erroneous identification of each of the low-level signal and the high-voltage signal.

The register unit 31 performs determination of the memory power V3 earlier than determination of the pull-up power V2. In other words, the memory power V3 is supplied to the memory unit 60 earlier than the pull-up power V2 supplied to each of the first interruption terminal 45 and the first reset terminal 46. This enables the controller 50 to reliably read the corresponding program from the nonvolatile memory 62 during activation thereof, making it possible for the controller 50 to reliably detect the first and second states of the first reset terminal 46.

Modifications

The present disclosure is not limited to the exemplary embodiment set forth above, and can be variously modified.

The register unit 31 according to the exemplary embodiment includes the register 31*a* and the logical processing unit 31*b*, but the present disclosure is not limited thereto. Specifically, the register unit 31 includes the register 31*a*, and the logical processing unit 31*b* is provided in the power management apparatus 30 separately from the register unit 31.

The power management apparatus 30 according to the exemplary embodiment is installed in the vehicular camera module 10, but can be installed in another device module.

The power management apparatus 30 is configured to generate the control power for the controller 50 for controlling the image sensor 70, but can be configured to generate the control power for the controller 50 for controlling another electrical load.

The functions of one element in the exemplary embodiment can be distributed as plural elements, and the functions that plural elements have can be combined into one element. At least part of the structure of the exemplary embodiment can be replaced with a known structure having the same function as the at least part of the structure of the exemplary embodiment. A part of the structure of the exemplary embodiment can be eliminated. At least part of at least one element of the exemplary embodiment can be added to or replaced with another element of the exemplary embodiment.

The present disclosure can be implemented by various embodiments in addition to the power management apparatus; the various embodiments include vehicular camera modules each including the power management apparatus, programs for serving a computer as the power management apparatus, storage media, such as non-transitory storage media, storing the programs, and power supply control methods.

While the illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A power management apparatus for a vehicular camera module, the power management apparatus being communicable with a controller for a vehicular camera via a communication interface, the power management apparatus comprising:
   a control power generator configured to generate control power and supply the control power to the controller;
   a reset terminal connected to the controller;
   a reset control circuit configured to transmit a reset control signal from the reset terminal to the controller for controlling resetting of the controller;
   a storage unit accessible by the controller via the communication interface; and
   a check unit configured to check for a state of the reset terminal, and store a checked result of the state of the reset terminal in the storage unit.

2. The power management apparatus according to claim 1, further comprising:
   a reset power generator configured to generate reset power that pulls up a voltage level of the reset terminal, wherein:
   the check unit is configured to:
      determine whether the reset power is directly applied to the reset terminal before activation of the controller; and
      store a first result of a determination by the check unit in the storage unit as the state of the reset terminal.

3. The power management apparatus according to claim 1, further comprising:
   a reset power generator configured to generate reset power that pulls up a voltage level of the reset terminal, wherein:
   the check unit is configured to:
      determine whether the reset terminal has opened after activation of the controller; and
      store a second result of a determination by the check unit in the storage unit as the state of the reset terminal.

4. The power management apparatus according to claim 1, further comprising:
   a watchdog circuit configured to write a predetermined watchdog data code into the storage unit; and
   a receiving unit configured to:
      periodically perform a receiving operation of receiving a watchdog communication based on the watchdog data code periodically transmitted from the controller;
      count a number of times the receiving unit does not receive the watchdog communication; and
      store the counted number of times in the storage unit; and
   a stop unit configured to:
      determine whether the counted number of times has reached a predetermined threshold; and
      stop the supply of the control power to the controller upon determining that the counted number of times has reached the predetermined threshold.

5. The power management apparatus according to claim 1, wherein:
   the check unit is configured to periodically check for the state of the reset terminal after activation of the controller, and update the checked result of the state of the reset terminal in the storage unit; and
   the power management apparatus further comprising:
   a stop unit configured to stop the supply of the control power to the controller in response to information indicative of prevention of power supply from the control power generator to the controller being transmitted thereto from the controller.

6. The power management apparatus according to claim 1, wherein:
   the check unit is configured to periodically check for the state of the reset terminal after activation of the controller, and update the checked result of the state of the reset terminal in the storage unit; and
   the checked result is transmitted from the storage unit to the controller, the controller going into an indefinite loop upon the checked result representing a fault state.

7. The power management apparatus according to claim 1, wherein:
   the reset control circuit is connected between the reset terminal and a ground, and is configured to connect of disconnect between the reset terminal and the ground, the power management apparatus further comprising:
   a reset power generator configured to generate reset power supplied to the reset terminal for pulling up a voltage level of the reset terminal; and
   a pull-down resistor connected between the reset terminal and the ground in parallel to the reset control circuit.

8. The power management apparatus according to claim 7, further comprising:
   a pull-up resistor having a first resistance and connected between the reset power generator and the reset terminal, wherein:
the pull-down resistor has a second resistance, the second resistance being higher than the first resistance.

9. The power management apparatus according to claim 7, further comprising:
a memory power generator configured to generate memory power supplied to a memory in which at least one program readable by the controller is stored,
wherein the memory power generated by the memory power generator is supplied to the memory earlier than the reset power supplied to the reset terminal.

10. A power management system comprising:
a power management apparatus according to claim 1; and
a controller for controlling a vehicular camera,
wherein the controller is configured to:
access the storage unit of the power management apparatus via the communication interface of the power management apparatus to thereby detect the checked result of the state of the reset terminal of the power management apparatus;
determine whether the checked result of the state of the reset terminal represents that there is a fault in the reset terminal;
shutdown itself upon the checked result of the state of the reset terminal representing that there is a fault in the reset terminal; and
perform a predetermined normal operation upon the checked result of the state of the reset terminal representing that there are no faults in the reset terminal.

11. A power management system comprising
a controller for a vehicular camera of a vehicular camera module;
a communication interface; and
a power management apparatus communicable with the controller for the vehicular camera via the communication interface,
the power management apparatus comprising:
a control power generator configured to generate control power and supply the control power to the controller;
a reset terminal connected to the controller;
a reset control circuit configured to transmit a reset control signal from the reset terminal to the controller for controlling resetting of the controller;
a storage unit accessible by the controller via the communication interface; and
a check unit configured to check for a state of the reset terminal, and store a checked result of the state of the reset terminal in the storage unit; and
the controller is configured to:
access the storage unit via the communication interface to thereby detect the checked result of the state of the reset terminal;
determine whether the checked result of the state of the reset terminal represents that there is a fault in the reset terminal;
shutdown itself upon the checked result of the state of the reset terminal representing that there is a fault in the reset terminal; and
perform a predetermined normal operation upon the checked result of the state of the reset terminal representing that there are no faults in the reset terminal.

\* \* \* \* \*